(12) United States Patent
Robert et al.

(10) Patent No.: US 6,380,321 B1
(45) Date of Patent: Apr. 30, 2002

(54) PROCESS FOR CARBONATION OF A LIVING DIENE POLYMER OBTAINED ANIONICALLY

(75) Inventors: Pierre Robert, Perignat-les-Sarlieve; Corinne Fradin-Cohas, Clermont-Ferrand; Bernard Anselme, Pont-du-Chateau, all of (FR)

(73) Assignee: Michelin Recherche et Technique S.A., Grantes-Paccot (CH)

( * ) Notice: Subject to any disclaimer, the term of this patent is extended or adjusted under 35 U.S.C. 154(b) by 60 days.

(21) Appl. No.: 09/621,834

(22) Filed: Jul. 24, 2000

(30) Foreign Application Priority Data

Jul. 23, 1999 (FR) .............................. 99 09641

(51) Int. Cl.$^7$ .................................. C08F 8/00
(52) U.S. Cl. ................. 525/383; 525/332.8; 525/332.7; 525/333.1; 525/333.2
(58) Field of Search ................ 525/332.8, 332.9, 525/333.1, 333.2, 383

(56) References Cited

U.S. PATENT DOCUMENTS 3,227,701 A   1/1966   Pennington ................. 260/94.7

FOREIGN PATENT DOCUMENTS

DE          139661           1/1980

*Primary Examiner*—Bernard Lipman
(74) *Attorney, Agent, or Firm*—Baker Botts LLP (57) ABSTRACT

The present invention relates to a process for carbonation of a living diene polymer obtained anionically. The carbonation process according to the invention is of the type consisting in spraying a solution of said polymer through at least one nozzle (5) into a chamber (2), in the form of droplets and in contact with carbon dioxide, into a bath which is substantially at rest filling said chamber (2) and formed of said carbon dioxide, such that said sprayed solution and said bath interact for said carbonation. This process is such that it consists in spraying said solution merely by the difference in hydrostatic pressure between the inlet to said or each nozzle (5) and the interior of said chamber (2).

11 Claims, 4 Drawing Sheets

PROCESS FOR CARBONATION OF A LIVING DIENE POLYMER OBTAINED ANIONICALLY

BACKGROUND OF THE INVENTION

The present invention relates to a process for carbonation of a living diene polymer obtained anionically. More precisely, the invention applies to the carbonation of a living polymer, at least one end of the molecule of which bears a C-M group, M being a metal, and in particular Li.

It is known that conjugated dienes and vinyl aromatic compounds may be polymerized or copolymerized with each other anionically, i.e., in the presence of an organometallic initiator, most frequently an organolithiated initiator. The process produces living polymers, having a C-M group or groups at the end(s) of the chain that can be used for a subsequent carbonation reaction.

Persons skilled in the art know that, during carbonation of a living polymer, the functionalization reaction which takes place produces not only a mono-adduct polymer having a carboxylic acid function at the chain end, $(P)CO_2H$, P being a polymer chain, but also secondary products: a bi-adduct, $(P)_2CO$, and a tri-adduct, $(P)_3OH$.

Numerous methods have already been proposed to direct the carbonation reaction towards forming the mono-adduct and to avoid forming the bi- and tri-adducts.

For example, as described in the Exxon Chemical patent specification WO-A-91104 993, it is possible to react the carbon-metal chain end with a deactivating agent, such as 1,1-diphenylethylene, or alternatively a-methylstyrene, then to effect carbonation in the presence of a polar diluent (generally THF), at a temperature not exceeding 20° C. (typically of the order of −10° C.).

Another method described by R. P. Quirk and Tian Yin, *Macromolecules*, vol. 22, p. 85 (1989), involves reacting the solution of living polymer with carbon dioxide, which is solid, at a temperature which is even lower (of the order of −78° C.), because it is known that the proportion of bi/tri-adducts is reduced by lowering the temperature.

Furthermore, it is generally accepted that the mixing conditions are a determining factor for controlling the proportion of the bi-/tri-adducts (see J. Villermaux, Genie de la Reaction Chimique, Conception et Fonctionnement des Reacteurs, Collection Technique et Documentation, Edition Lavoisier (2nd edition 1985) chapter 8).

From this perspective, it is known from patent specification GB-A-921 803 to effect the carbonation reaction of the living polymer in a zone of turbulence, for example in a T-shaped tube, into which zone a solution of living polymer and carbon dioxide is introduced.

In this process, a very great excess of carbon dioxide is used, representing 2 to 50 times the stoichiometrically necessary quantity. The reaction is carried out at a temperature of between −50° C. and 15° C., with the cold temperature necessary for cooling the solution of living polymer being obtained, due to the expansion of the carbon dioxide. The latter is introduced into a turbulence chamber by means of an injector at a pressure of 0.7 to $7 \times 10^5$ Pa.

East German patent specifications DD-A-139 661 and DD-A236 537 provide processes for the carbonation of living polymers which essentially consist of spraying a living polymer, for example a lithiated one, into a turbulent carbon dioxide current characterized by a very high pressure and flow rate. The pressure is set at $8 \times 10^5$ Pa, and said flow rate is at least 2,500 l/h. The carbonation temperature must be kept within a range from −20° C. to 20° C. approximately, and is preferably kept at 0° C.

One major disadvantage of these processes using carbon dioxide under turbulent conditions is that they require a large amount of this gas, one significantly greater than the stoichiometric quantity. Because of this, the implementation of a recycling system and purification of the excess carbon dioxide may be necessary, owing to the production and tonnage constraints which are required on an industrial scale.

Another disadvantage of these processes resides in the necessity of controlling the temperature of the reaction medium or of the incoming flows, such that the temperature of said reaction medium is permanently located in a restricted range limited to relatively low temperatures, in order to permit a good carboxylation yield.

U.S. Pat. No. 3,227,701 discloses, in its examples, a carbonation process which involves spraying a living polybutadiene into a chamber and into contact with carbon dioxide at rest. The polymer is brought into the chamber under pressure by means of a dispersion device comprising, at its outlet, a motor-driven rotary disc having deflectors surrounding said disc which are intended to divide the particles of polybutadiene dispersed into the chamber thereby.

The process described in the '701 patent provides that the temperature of the carbonation reaction lies between approximately −50 and 15° C., and the pressure of carbon dioxide in the chamber varies substantially from $10^5$ to $10 \times 10^5$ Pa. One major disadvantage of this process lies in the relatively narrow temperature and pressure ranges which can be used.

SUMMARY OF THE INVENTION

The inventors have discovered an improved process for carbonation of a living diene polymer which involves spraying a solution of the polymer, in the form of droplets, through one (or more) nozzle(s) into a chamber containing a carbon dioxide bath substantially at rest which fills said chamber. Surprisingly, a difference in hydrostatic pressure between the inlet to the nozzle and the chamber, which allows the sprayed solution and carbon dioxide bath to interact for carbonation of the polymer, overcomes the disadvantages of prior art processes and provides for obtaining a high yield of mono-adduct. The difference in hydrostatic pressure achieves a particular division of the sprayed particles of living polymer solution, making it possible to carry out the carbonation reaction at a wider temperature range, advantageously between −50° C. and 100° C.

BRIEF DESCRIPTION OF THE DRAWINGS

The invention described herein will be better understood by reference to the following detailed description and non-limiting examples and the attached drawings, of which.

DETAILED DESCRIPTION OF THE INVENTION

It will be noted that the difference in hydrostatic pressure used for spraying achieves a particular division of the sprayed particles of living polymer solution, which makes it possible to utilize a wider temperature range for implementing the carbonation reaction, the temperature advantageously varying between −50° C. and 100° C.

In particular, the temperature of the reaction medium within the chamber, which is practically equal to that of the solution of living polymer during spraying, owing to the reduced mass contribution of the carbon dioxide, makes it possible, in contrast to the prior art, to implement the carbonation reaction at a temperature higher than 15° C., advantageously at a temperature close to that of the environment, while achieving a high yield of mono-adduct.

However, it is also possible to operate at relatively low temperatures in the chamber, close to −5° C., for example.

Preferably, the difference in hydrostatic pressure in the process is a value from 10 Pa to $10 \times 10^5$ Pa, which for the relative pressure of the carbon dioxide in said chamber, is a value of between $0.01 \times 10^5$ and $10 \times 10^5$ Pa. It will also be noted that this difference in hydrostatic pressure which is used for spraying determines, for a given nozzle geometry, the spraying rate of the nozzle.

Conversely, the flow rate used for the nozzle depends on the geometry of the nozzle, the dynamic viscosity of the solution of living polymer to be sprayed and, to a large extent, the difference in hydrostatic pressure upstream to and downstream from the nozzle. For example, for a nozzle constructed of a wall defining a circular orifice of 0.5 mm in diameter and having a length of 2 mm, in which a solution of living polymer in toluene having a dynamic viscosity of the order of 0.08 Pa.s is sprayed, the flow rate may vary from 1 to 30 kg/h when the difference in hydrostatic pressure varies between $10^5$ and $10 \times 10^5$ Pa. If the dimensions of the nozzle are modified, the flow rates are readily calculated by known calculation methods.

The pressure in the chamber is kept at a given value by introducing carbon dioxide as the reaction progresses in order to replace the carbon dioxide which has reacted. Under these circumstances, there is practically no turbulence in the chamber.

When a plurality of spraying nozzles is used for the solution of living polymer, preferably the spacing between each nozzle is determined such that there is no overlap between the spraying cones in order to avoid coalescence of the droplets emitted.

In carrying out the process, it is advantageous that the solution of living polymer be sprayed in the form of a jet of droplets substantially in the form of a hollow cone having a crown-shaped section, wherein the droplets have an average size of less than 100 $\mu$m.

A finer spray of the living polymer solution results in a polymer product that is primarily a mono-adduct polymer having a carboxylic acid function at the chain end. Filamentary flows of the solution of living polymer do not prevent the formation of dimeric ketone $(P)_2CO$. However, the formation of droplets makes it possible to reduce the proportion of this dimeric ketone $(P)_2CO$. The more the size of the droplets of the solution of living polymer is reduced, the more that a high proportion of mono-adduct $PCO_2H$ is obtained, until a pure mono-adduct is obtained. The nature of the product, however, makes any measurement of droplet size difficult. It is therefore generally necessary to experimentally determine the degree of spraying to be adopted to obtain the desired result.

According to one embodiment of the invention, the process uses a tower as a chamber, such that spraying is carried out in an upper part of the tower and that a solution of carbonated polymer is collected in a lower part of the tower. For example, it is possible in this case to introduce the carbon dioxide via one (or more) side inlet(s) provided in the lower part of the tower. Preferably, said process uses a solution of living polymer having a Newtonian viscosity of less than 2 Pa.s for the spraying thereof.

In a further aspect of the invention, the carbonation process in the chamber is stopped by reacting the solution of carbonated polymer with a sufficiently strong acid, under stirring, in order to obtain a carbonated polymer bearing one or more carboxylic acid functions at its chain end or ends.

The polymer obtained by reacting the droplets of living polymer in the bath of carbon dioxide is a carboxylate, for example a lithium (Li) carboxylate. To obtain the polymer bearing one or more carboxylic acid functions at its chain end or ends, it is necessary to treat the carbonated polymer with a sufficiently strong acid, for example, an organic acid such as oxalic acid, or an inorganic acid such as hydrochloric acid.

According to an embodiment of the invention, the solution of carbonated polymer is stirred in a tank which communicates with the chamber in which carbonation has been carried out, and at the same time the acid is sprayed in the form of droplets toward the tank. Advantageously, the acid is sprayed through one (or more) nozzle(s) provided in the upper part of the tower, such that the droplets of acid can entrain the carbonated particles which have remained on the side wall of the tower towards the tank.

Thus a carbonated living polymer is obtained which is primarily a mono-adduct polymer having a carboxyl function at least one of its chain ends and which is devoid of secondary products. The product is formed by spraying a solution of living polymer into a bath of carbon dioxide without using a carrier gas, i.e., solely under the action of hydrostatic pressure.

The carbonation yield is a function of the dwell time of the droplets of living polymer in the carbon dioxide. Consequently, where the process of the invention is carried out in a tower, the yield is a function of the falling time of the droplets between the spraying nozzle(s) and the zone where the solution of carbonated polymer is recovered at the bottom of the tower. Since the size of the droplets and their rate of ejection from the nozzle(s) influences the drop rate, the person skilled in the art will therefore select a tower height matched to the selected spraying conditions and, as will be explained below, to the pressure of the carbon dioxide in the tower.

For a chamber formed of a tower of given height, and for a relative pressure of carbon dioxide of less than $10^5$ Pa within the tower, it is possible to adjust the rate of carbonation of said living polymer by varying the pressure and the molar flow rate of the carbon dioxide relative to the flow rate of the solution of living polymer. For relative pressures of carbon dioxide within the chamber which are greater than $10^5$ Pa, carbonation is generally complete.

The carbonation process according to the present invention can be used for carbonation of any living polymer. It is known that living polymers are homopolymers of conjugated dienes obtained by polymerization of a conjugated $C_4$–$C_{12}$ diene monomer or copolymers of several of these dienes with each other or one of these dienes with one (or more) $C_8$–$C_{22}$ vinyl aromatic compound(s).

The present invention is equally suited to the carbonation of living polymers of low molecular weight, typically less than 20,000 g/mol, as well as living polymers of high molecular weight, typically from 100,000 to 300,000 g/mol, provided that the concentration of the polymer solution is adjusted so that spraying is possible and that the Newtonian viscosity of this solution is less than 2 Pa.s.

The conjugated dienes which can be used include 1,3-butadiene, 2-methyl-1,3-butadiene, 2,3-di($C_1$ to $C_{15}$ alkyl)-1,3-butadienes, including 2,3-dimethyl-1,3-butadiene, 2,3-diethyl-1,3-butadiene, 2-methyl-3-ethyl-1,3-butadiene, and 2-methyl-3-isopropyl-1,3-butadiene, isoprene, phenyl-1,3-butadiene, 1,3-pentadiene and 2,4-hexadiene.

Preferably, the homopolymer is a polybutadiene, particularly a polybutadiene having a 1,2 bond content of between 4 and 80%, or a polyisoprene.

Vinyl aromatic compounds for use in the invention include styrene, the ortho-, para- and meta-methylstyrenes, in particular the commercial mixture known as vinyltoluene, para-tert.-butylstyrene, the methoxy-styrenes, vinyl mesitylene, divinyl benzene and vinyl naphthalene.

The copolymers used may contain between 99% and 20% by weight of diene units and between 1% and 80% by weight of vinyl aromatic units. Preferred copolymers include styrene/butadiene copolymers having a styrene content of between 4 and 50% by weight, more particularly between 20 and 40% by weight, a 1,2 bond content of the butadiene part of between 4 and 65% by weight and a trans-1,4 bond content of between 30 and 80% by weight. Also butadiene/isoprene copolymers may be used, in particular those having an isoprene content of between 5 and 90% by weight and a glass transition temperature (Tg) of between −40° C. and −80° C., as well as isoprene/styrene copolymers, in particular those having a styrene content of between 5 and 50% by weight and a glass transition temperature of between −25° C. and −50° C. Butadiene/styrene/isoprene terpolymers may also be used, in particular those having a glass transition temperature of between −20° C. and −70° C., particularly those having a styrene content of between 5 and 50% by weight, more particularly between 10 and 40% by weight, an isoprene content of between 15 and 60% by weight, more particularly between 20 and 50% by weight, a butadiene content of between 5 and 50% by weight, more particularly between 20 and 40% by weight, a 1,2 bond content of the butadiene part of between 4 and 85% by weight, a trans-1,4 bond content of the butadiene part of between 6 and 80% by weight, a-1,2 plus 3,4 bond content of the isoprene part of between 5 and 70% by weight and a trans-1,4 bond content of the isoprene part of between 10 and 50% by weight.

These polymers are prepared by known polymerization methods in the presence of an initiator formed by one (or more) organometallic compound(s), in particular organoalkaline and, preferably, organolithiated ones. Preferred organolithiated initiators include monolithiated aliphatic organolithium compounds, such as ethyllithium, n-butyllithium, isobutyllithium, tert.butyllithium, secondary butyllithium, or dilithiated ones, such as polymethylene dilithium, for example 1,4-dilithiobutane or 1,4-dilithiotetraphenylbutane (see H. Gilman and H. Haubein, *J. Am. Chem. Soc.* 66, 1515, 1944). Amides of lithium, rare earth compounds, in particular neodymium compounds, or barium derivatives also may be used. Reference may be made to European Patent Specification EP-A-406 920 for the use of rare earth compounds, and to French Patent Specification FR-A-2 294 186 for the use of barium derivatives.

The polymerization is generally performed in the presence of an inert solvent, which may be an aliphatic or alicyclic hydrocarbon, such as pentane, hexane, iso-octane, cyclohexane, and methylcyclohexane or an aromatic hydrocarbon such as benzene, toluene or xylene. The solution to be polymerized may also contain an ether-type polar solvent, such as tetrahydrofuran, or an arnine type solvent such as tetramethyl-ethylene-diamine. Randomizing agents may also be added, such as sodium alcoholates. The polymerization is generally performed between 0 and 120° C., preferably between 20 and 100° C.

The carbonation process according to the invention has the following advantages. It is possible to produce the carbonated polymer with a minimum amount of carbon dioxide; therefore it is not necessary to recycle carbon dioxide. The amount of carbonation can be adjusted by modifying the carbon dioxide gas pressure in the chamber. The process makes it possible to work within a wide range of temperatures, in particular, at ambient temperature, without affecting the carbonation yield. The process permits large-scale production.

EXAMPLE 1

Synthesis of a Polybutadiene of Low Molecular Weight Comprising a Carboxylic Acid Function at One of the Two Ends of its Chain.

Figures 1, 2:
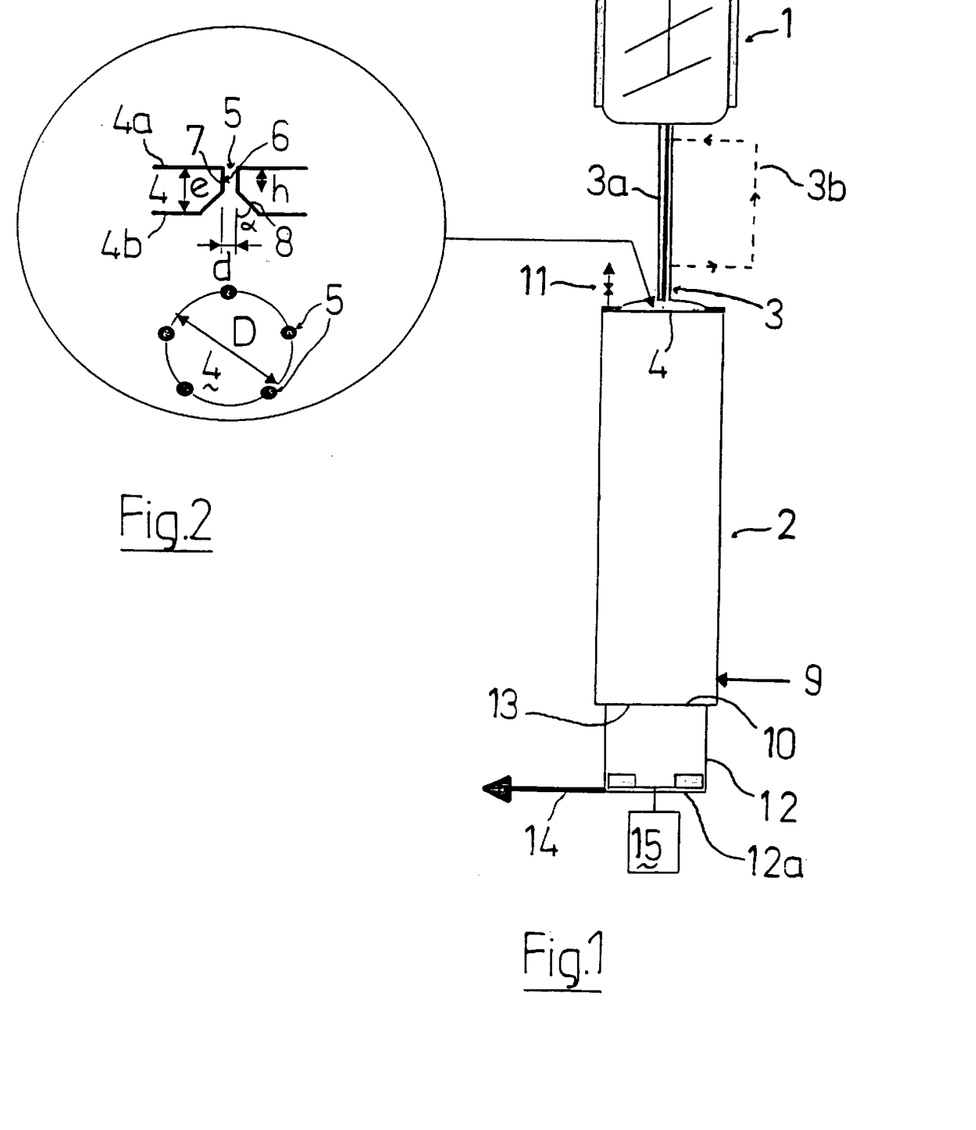
FIG. 1 is a diagram of a section through a device for implementing the carbonation process of the invention.
FIG. 2 is a medallion illustrating the upper part of a carbonation chamber of the device of FIG. 1. The lower drawing in the medallion is a diagram of a top view of said upper part, while the upper drawing is a detailed section through the part.

1. Synthesis of a polybutadiene:

The polymerization was effected discontinuously under an inert atmosphere in a dual jacketed reactor 1, having a 30 liter capacity (cf. FIG. 1).

The following were introduced into reactor 1:
- 21.2 liters of deaerated toluene,
- 1.91 kg of butadiene,
- 336 ml of a solution of 1 mol/l of tetrahydrofuran (THF) in toluene
- (1150 ppm), and
- 472 ml of a solution of 1 mol/l of butyllithium in toluene, which
- corresponds to 0.025 mol of butyllithium per 100 g of butadiene.

The polymerization temperature was 40° C. (±2° C.). The conversion was total after 30 minutes. The resulting polymer had a number-average molecular weight (Mn), measured by tonometry, of 3500 g/mol. The proportion of vinyl linkages, determined by $^1$H NMR, was 40%.

2. Carbonation of the Polymer:

With reference to FIG. 1, carbonation was carried out in a cylindrical carbonation tower 2 which is connected to the reactor 1 by means of dual-jacketed pipes 3 constituting a heat-exchanger. The outer casing 3a of these pipes 3 is intended to receive a heat exchange fluid such as water, which may circulate in a closed circuit 3b (symbolized by arrowed dashes).

With reference to FIG. 2, viewed from below, the upper end of the tower 2 comprises a plate 4, for example of stainless steel, having on its periphery a plurality of identical orifices 5 of circular section, which are intended to permit spraying of the solution of living polymer within the tower 2. The orifices 5, in this example, are centered on a circle which itself is centered on the longitudinal axis of the tower 2 and has a diameter D of 20 mm.

More precisely, each of these orifices 5 is defined by a wall 6, the profile of which can be seen in FIG. 2, viewed from above. This wall 6 connects the outer face 4a to the inner face 4b of the plate 4. It can be seen that the wall 5 comprises a cylindrical inlet section 7 perpendicular to said face 4a, of diameter d of 0.5 mm and of height h of 2 mm, which is extended in centered manner by an outlet section 8 in the shape of a straight cone, diverging from the inlet section 7 by an angle a close to 45° and of a height of 1 mm. The plate 4 thus has a thickness a of 3 mm.

In FIG. 1, the tower 2 is provided with a side inlet 9 for the introduction of carbon dioxide into the inner space thereof. In this embodiment, this inlet 9 is provided close to the lower end 10 of said tower 2.

The tower 2 also comprises a degasification conduit 11, to reduce the internal carbon dioxide pressure following carbonation.

The tower 2 in this example has a diameter of 106 mm and a height of 760 mm.

A stirred tank 12 which is intended to receive and treat the solution of carbonated polymer is provided downstream of the tower 2. More precisely, this tank 12 comprises an inlet 13 which communicates with said lower end 10 of the tower 2 in a manner centered relative to the latter, and an outlet 14 for recovering the treated carbonated polymer. This tank 12 is provided in its base 12a with a stirrer 15, for example formed of a "Rushton"-type turbine.

In this embodiment, the process of the invention was carried out four times (tests 1–4), each being characterized by the following:

1) The temperature of the solution of living polymer at the upper end 4 of the tower 2 for the carbonation was close to 20° C., achieved by heat exchange in the pipes 3.

2) The carbonation reaction in the tower 2 was characterized first, by an upstream pressure given for the solution of living polymer at the inlet to the spraying orifices 5 and second, by a pressure of carbon dioxide in the chamber or downstream pressure in the interior of the tower 2.

Carbon dioxide in a dry state, at a temperature close to ambient temperature and at a relative pressure of 1 bar is introduced into the tower 2 at the location of inlet 9.

The losses of head for the spraying orifices 5, i.e., the differences in hydrostatic pressure, and consequently the spraying conditions in tower 2, were varied in the four tests.

3) The carbonation reaction in the tank 12 was stopped by an addition of 2 lithium equivalents of oxalic acid, a sufficiently strong acid for the protonation of the solution of carbonated polymer, in order to obtain a polymer bearing a carboxylic acid function at the chain end.

This addition of acid was carried out by spraying in the aforementioned orifices 5 after having degassed tower 2 via the conduit 11, such that the droplets of acid emitted make it possible to entrain the solid carbonated particles which remained in contact with the wall of the tower 2 upon carbonation towards the tank 12.

The polymer thus carbonated and protonated was subjected to antioxidant treatment by addition of 2,2'-methylene bis(4-methyl-6-tert.butylphenol) (1 g per 100 g of elastomer), and then dried at 50° C. at reduced pressure.

The polymers thus obtained were characterized by size exclusion chromatography (SEC technique), which involves physically separating the macromolecules according to their size in the swollen state on columns filled with a porous stationary phase. The macromolecules are separated by their hydrodynamic volume, with the most voluminous emerging first.

While not an absolute method, SEC constitutes a suitable technique for ascertaining the distribution of the molecular weights of a polymer. Using standard products whose characteristics are described in European Patent Specification EP-A-692 493, the different number-average weights (Mn) and weight-average weights (Mw) of the polymers were determined as described in said document, and the polydispersity index was calculated (Ip=Mw/Mn).

The sample of polymer to be analyzed was solubilized in tetrahydrofuran, at a concentration of approximately 1 g/l.

The apparatus used was a WATERS chromatograph model "150 C". The polymerization was, in known manner, generally performed in the presence of an inert solvent, which may be an aliphatic or alicyclic hydrocarbon, such as pentane, hexane, iso-octane, cyclohexane or methylcyclohexane, or an aromatic hydrocarbon, such as benzene, toluene or xylene. The eluting solvent was tetrahydrofuran, the flow rate was 35 ml/min, the temperature of the system was 30° C. and the analysis time was 30 min. The injected volume of the sample of polymer was 100 µl. The detector was a WATERS model "R401" differential refractometer, and the software for processing the chromatographic data was the system sold under the name "WATERS MILLENIUM" (version 2.10).

The SEC chromatograms obtained revealed the presence in a more or less great quantity of chains (functional PB) having a weight greater than that of the polymer before carbonation (control PB). A test using 2,4-dinitrophenylhydrazine (2,4-DNPH) permitted demonstration that these chains correspond to the bi-adduct, that is to say, the dimeric ketone $(P)_2CO$.

2,4-DNPH was used for this purpose because it has the advantage, after reaction with the ketone function of the bi-adduct, of forming a colored hydrazone which can be made visible by ultraviolet spectroscopy. The detector was a WATERS model "R401" differential refractometer, and the software for processing the chromatographic data was the system sold under the name "WATERS MILLENIUM" (version 2.10). The polymer thus treated was recovered by coagulation in methanol and dried at 50° C. under reduced pressure. SEC analysis with detection using ultraviolet radiation at 370 nm revealed selective absorption of the fraction of chains of greatest weight, which can only be explained by the presence of a hydrazone function.

The proportion of carboxylic acid functions at the chain end was measured by $^1H$ NMR, after esterification with an excess of diazomethane, a reagent known to react with carboxylic acid functions. More precisely, this method uses diazomethane to produce a methyl ester of the —COOH function which has been fixed to the chain end of the polymer, providing indirect and quantitative access to the proportion of —COOH functions by $^1H$ NMR.

The diazomethane was prepared beforehand by reacting alcoholic potassium hydroxide solution with N-methyl-N-nitrosoparatoluenesulphonamide, in the presence of diethyl ether, at the temperature of melting ice. Then the ether phase containing the reagent was recovered by simple distillation.

The esterification reaction was then carried out as follows. A sample of polymer which had previously undergone three cycles of dissolution in toluene and coagulation in methanol, then drying under reduced pressure at 50° C., was solubilized in toluene. The ether solution containing the diazomethane was then added to the solution thus obtained in such a way as to give an excess of reagent relative to the —COOH functions. The polymer treated in this way was then coagulated in methanol, after which it was redissolved twice in toluene and in methanol for the coagulation thereof.

The polymer was then dried in a desiccator at ambient temperature and under a high vacuum by means of a vane pump.

The $^1$H NMR analysis was then performed as follows. A sample of the polymer esterified in this way was solubilized in carbon disulphide. The $^1$H NMR signal was analyzed using a spectrometer marketed under the name "BRUKER AC200". The characteristic signal of the three methyl protons of —COOCH$_3$ provides quantitative access to the initial proportion of —COOH functions in the functional polymer.

Table 1 summarizes the four tests performed for this first embodiment. For each of the tests, the temperature of the carbonation reaction in the tower 2 is shown, which is practically equal to the temperature of the solution of living polymer at the inlet to the spraying orifices 5.

The weight percent of bi-adduct is shown in this table. It is calculated by calculating the ratio between the peak corresponding to the bi-adduct and the total area of the surface which is located beneath the curve of distribution of the molecular weights. The surfaces were provided by the software used to process the chromatographic data.

TABLE 1

| tests | carbonation reaction temperature (0° C.) | relative P upstream of the spraying orifices (bar) | relative P in the tower or downstream pressure (bar) | loss of head in the spraying orifices (bar) | mass % of bi-adduct deduced from the SEC analysis |
|---|---|---|---|---|---|
| 1 | 19 | -5.5 | 5 | -0.5 | -10% |
| 2 | 19 | 2 | 1 | 1 | -6% |
| 3 | 19 | 4 | 1 | 3 | between 0 and 2% |
| 4 | 18 | 8 | 4.5 | 3.5 | between 0 and 2% |

It will be noted that, from test No. 1 to test No. 4, the increase in the loss of head which was tested in the spraying orifices 5 (from 0.5 bar to 3.5 bar) was accompanied by an increase in the mass flow rate of the sprayed solution, which changed from about 4 to 17 kg/h from test No. 1 to test No. 4 and, by a reduction in the size of the sprayed droplets, owing to the differences in flow conditions in the orifices 5 which resulted therefrom.

For test No. 3 in particular, the proportion of functions measured by $^1$H NMR as described above was 265 meq/kg (milli-equivalent of functions per kg of rubber) which, taking into account the molecular weight measured by tonometry on the polybutadiene before reaction (3500 g/mol), corresponds to a carbonation yield of 92%.

Conclusions

The percentage of bi-adduct, i.e., dimeric ketone P$_2$CO, is primarily controlled by the difference between upstream and downstream pressure of the spraying orifices 5.

The carbonation reaction is directed towards the virtually exclusive formation of the mono-adduct, i.e., polymer comprising a carboxylic acid function at the chain end, when pressure conditions are used which promote an as fine as possible spray of the living polymer solution.

EXAMPLES 2 TO 5

Synthesis of Polymers of Low Molecular Weight Comprising a Carboxylic Acid Function at Each of the Two Ends of the Chain In examples 2 to 5, the polymerization initiator was the dilithiated compound 1,4-dilithiotetraphenylbutane (DLTB), the content of carbon-lithium bonds of which was determined by Gilman dosing (J. Am. Chem. Soc. 66 1515, 1944).

The installation used was similar to that in Example 1 and FIG. 1 above, except that:

the tower used had a diameter of 230 mm and a height of 2200 mm;

the upper end of the tower comprised a single nozzle (not shown) sold by the company SPRAYING SYSTEMS under the name "UNIJET" for spraying the solution of living polymer. This nozzle has a spraying orifice of the "hollow cone TX4" type, i.e., one of a diameter of 1 mm and a length of 0.86 mm. The orifice was adapted to generate an eddying liquid at its outlet, of a section in the form of a crown, which describes a volume in the form of a diverging hollow cone.

The upper end of the tower also comprised another nozzle "UNIJET TX4" (not shown) adjacent to the preceding one for spraying a strong acid for the protonation of the carbonated polymer.

In the following Examples 2 to 5 the description of the elements of the installation relating to which have an identical structure to those of Example 1 are identified by the same numerical references as those used in Example 1.

EXAMPLE 2

Synthesis of a Polybutadiene Comprising a Carboxyl Function at Each Chain End, with a Low Temperature for the Carbonation (-3° C.).

1. Synthesis of a polybutadiene:

The polymerization was effected discontinuously in a 30-liter reactor, such as reactor 1 above, under an inert atmosphere.

The following were introduced into reactor 1:

11.9 liters of deaerated toluene, 1.086 kg of butadiene, 148 ml of a solution of 1.29 mol/l of tetrahydrofuran (THF) in toluene (1150 ppm), 446 ml of a solution of 0.975 mol/l DLTB in toluene, which corresponds to 0.04 mol of C-Li bonds per 100 g of butadiene.

The polymerization was carried out at 40° C. (±2° C.). The conversion was total after 90 minutes. The resulting polymer had a number-average molecular weight (Mn), measured by tonometry, of 4600 g/mol. The proportion of vinyl linkages, determined by $^1$H NMR, was 40%.

2. Carbonation of the polymer:

The solution of living polymer thus synthesized was pre-cooled by means of the outer casing of the reactor 1 for carbonation. A volume of THF representing 2.5% of the reaction medium was then added to the polymer solution.

The solution thus obtained was further cooled to -4° C. for carbonation by heat exchange in pipes 3, then introduced into the single spraying nozzle.

The relative pressure upstream of the nozzle was 9.4 bar and the relative pressure in the tower (or downstream pressure) was kept at 1 bar by introducing carbon dioxide via inlet 9 (in a dry state and at a temperature close to ambient temperature). A loss of head of 8.4 bar resulted for this nozzle.

The temperature at the upper end of tower 2, i.e., the carbonation temperature, was -3° C. The feed rate of the solution of living polymer was 40 l/h. The spraying was carried out by a single nozzle for 21 minutes, corresponding to 14.2 l of sprayed solution.

The very fine droplets emerging from the single nozzle very rapidly became solid in contact with the carbon dioxide to yield a solution of carbonated polymer having a flocculent appearance. More precisely, the average size of the sprayed droplets was less than 100 μm.

At the end of the spraying, a protonation treatment of the carbonated polymer solution was carried out, which differed from that of Example 1 as follows. After degassing the tower, 3.5 liters of a solution of 1 mol/l of hydrochloric acid (HCl) in tetrahydrofuran were sprayed using the protonation nozzle at a pressure of 4 bar, while, at the same time the stirrer 15 was rotating at a speed of 1400 rpm. The effect of this addition of acid was to fluidize the medium by breaking the associations between lithium carboxylate ends —COOLi, particularly for the solid carbonated particles which have remained on the wall of the tower 2.

The stirring was maintained for 10 minutes, then an antioxidant was added (1 g of N-phenyl-N'-dimethyl-1,3-dibutyl paraphenylenediamine per 100 g of polymer), before the solution obtained was drawn off. Then it was washed to neutrality with water to eliminate excess HCl. The polymer was then dried at 50° C. at reduced pressure.

Figure 3:
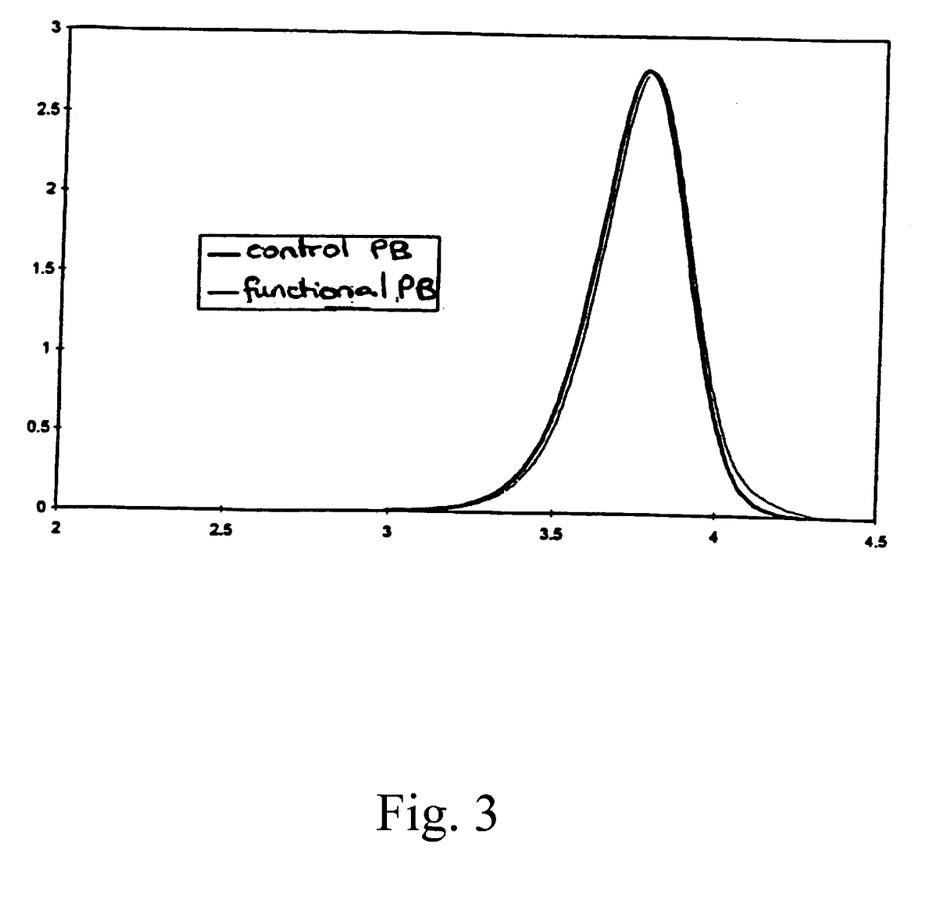
FIG. 3 is a graph of molar weight distributions of carbonated (functional PB) and non-carbonated (control) polybutadiene produced in Example 2, determined by size-exclusion chromatography (SEC).

The solution of polybutadiene which has reacted with the carbon dioxide (referred to as "functional PB"), was characterized by SEC in comparison with a sample taken before introduction of the carbon dioxide and protonated by addition of methanol (referred to as "control PB"). As shown in FIG. 3, the functionalization has not induced any significant modification of the distribution of the molar weights.

The proportion of —COOH functions was calculated using the dosing method of Example 1. The $^1$H NMR analysis gave a proportion of (—COOCH$_3$) functions of 367 meq/kg, which, given the molecular weight measured by tonometry on the polybutadiene before carbonation (4600 g/mol), corresponds to a proportion of functions of 85%.

EXAMPLE 3

Synthesis of a Polybutadiene Comprising a Carboxyl Function at Each Chain End, with a Carbonation Temperature Close to Ambient Temperature (20° C.).

The synthesis of the polybutadiene was carried out under the same conditions as in Example 2. A polymer was obtained having a number-average molecular weight (Mn), measured by tonometry, of 4850 g/mol. The proportion of vinyl linkages, determined by $^1$H NMR, was 41%.

As in Example 2, a volume of THF corresponding to 2.5% of the reaction medium was added to the polymer solution thus synthesized. Then the polymer solution was brought to 23° C. by heat exchange in pipes 3, for carbonation.

The carbonation was carried out in the same manner as for Example 2, except that the temperature of the carbonation reaction was 20° C. The appearance of the sprayed solution of polymer on emerging from the nozzle was comparable to that described in Example 2 (very fine droplets which solidified in contact with the carbon dioxide).

The rest of the operations were carried out as in Example 2.

Figure 4:
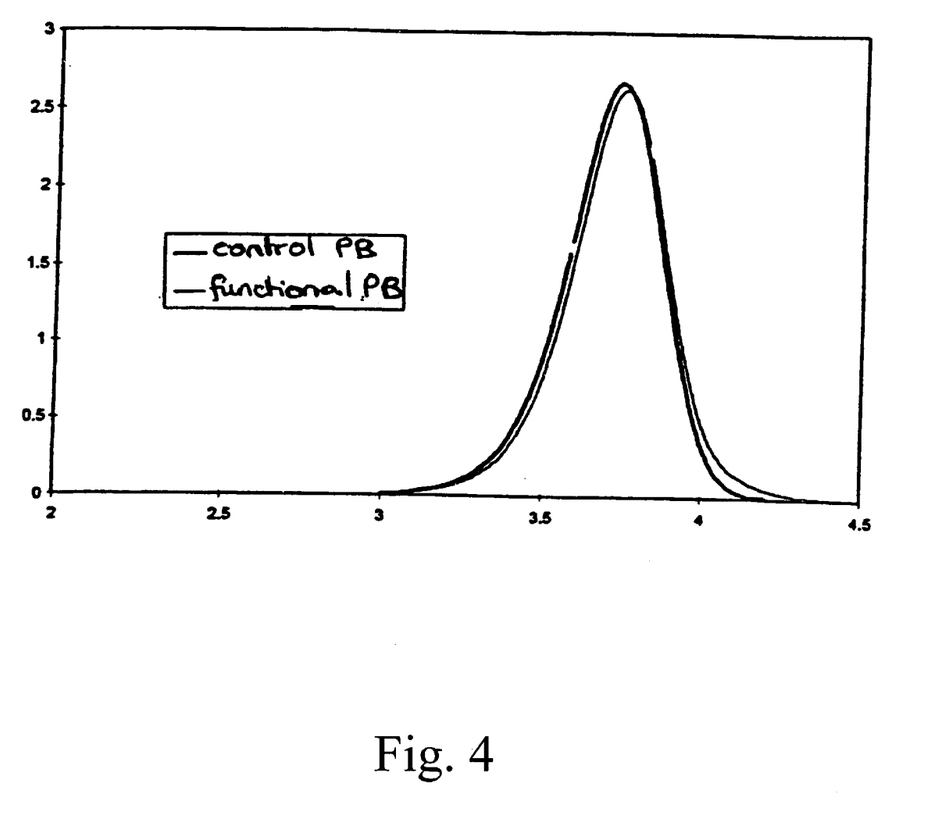
FIG. 4 is a graph of molar weight distribution of the functionalized and control polymers of Example 3 determined by SEC.

The SEC analysis shown in the graph in FIG. 4 indicates that functionalization had not induced any significant modification of the distribution of the molar weights.

The $^1$H NMR analysis gave a proportion of (—COOCH$_3$) functions of 367 meq/kg, which, given the molecular weight measured by tonometry on the polybutadiene before carbonation (4850 g/mol), corresponds to a proportion of functions of 89%.

EXAMPLE 4

Synthesis of a Polybutadiene Comprising a Carboxyl Function at Each Chain End, with a High Temperature for the Carbonation (81° C.).

The synthesis of the polybutadiene was carried out under the same conditions as in Example 2. A polymer was obtained having a number-average molecular weight (Mn), measured by tonometry, of 4900 g/mol. The proportion of vinyl linkages, determined by $^1$H NMR, was 40%.

The polymer solution was brought to 18° C., then a volume of THF corresponding to 2.5% of the reaction medium was added.

The temperature of the solution was raised to 81° C. by heat exchange in pipes 3 for the carbonation. To accomplish the heat exchange, water at 95° C. was introduced into the outer casing of the pipes 3.

The carbonation was carried out as in Example 2, except that the temperature at the upper end of the tower was 81° C. A finer spray than in Examples 2 and 3 was obtained, since the formation of a mist was observed on leaving the nozzle, which solidified on contact with the carbon dioxide.

The rest of the operations were carried out as in Example 2.

Figure 5:
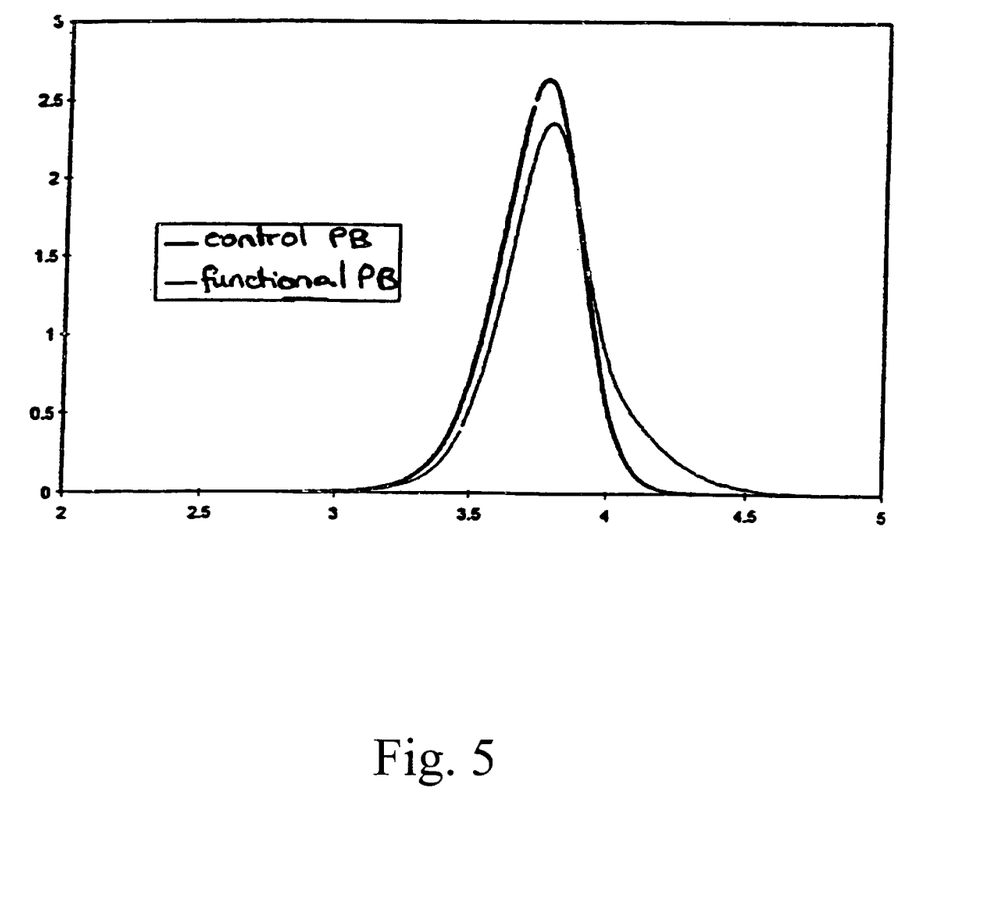
FIG. 5 is a graph of molar weight distribution of the functionalized and control polymers of Example 4 determined by SEC.

The SEC analysis shown in FIG. 5 indicates that the control of the functionalization reaction was a little less satisfactory. It is apparent that there is a widening of the distribution of the molecular weights towards the higher weights of the carbonated polymer, which indicates parasitic reactions to functionalization.

The $^1$H NMR analysis after esterification with diazomethane as in Example 1, gave a proportion of (—COOCH$_3$) functions of 317 meq/kg. Taking into account the molecular weight determined by tonometry on the polybutadiene before functionalization, a proportion of functions of close to 80% was obtained.

Conclusions by Comparison of Examples 2, 3 and 4

EXAMPLES 3 AND 4

Effects of Temperature and Dynamic Viscosity on the Polymer Solution to be Carbonated.

It was observed that the smaller the average size of the droplets of the sprayed solution and the higher the temperature of said solution, the dynamic viscosity thereof was lower. However, at 80° C. (Example 4) parasitic reactions were noted which are non-existent at 20° C. (Example 3) and at −3° C. (Example 2).

EXAMPLES 2, 3 AND 4

It was observed that a drop in temperature promotes COOH functionalization, despite a lesser dispersion of the reaction medium. This result is in accordance with the prior art, since at very low temperature (−78° C.), it is possible to perform the reaction in a continuous medium, as reported in *Macromolecules* vol. 22, p. 85, 1989.

EXAMPLE 5

Synthesis of a Styrene/butadiene Copolymer Comprising a Carboxyl Function at Each Chain End, with a Low Temperature (−1° C.) of the solution to be carbonated.

The polymerization was effected discontinuously in a 30-liter reactor, such as reactor 1, under an inert atmosphere.

The following were introduced into the reactor:

11.03 liters of deaerated toluene, 644 g of butadiene, 362 g of styrene, 137 ml of a solution of 1.29 mol/l of tetrahydrofuran in toluene (150 ppm), and 433 ml of a solution of 0.93 mol/l DLTB in toluene, which corresponds to 0.04 mol of C-Li bonds per 100 g of monomer.

The polymerization was carried out at 40° C. (±2° C.). The conversion was total after 90 minutes. The resulting polymer had a number-average molecular weight (Mn), measured by tonometry, of 4960 g/mol. The percentage of incorporated styrene, measured by $^1$H NMR, was 37%, and the proportion of vinyl linkages was 42% for the butadiene part.

The temperature of the reaction medium was brought to 20° C., then a volume of THF corresponding to 2.5% of the total volume was added. Then the temperature of the polymer solution was further cooled to −5° C., as in Example 2, for the carbonation.

The carbonation operation was carried out as in Example 2, except that the temperature at the upper end of the tower was −1° C. The formation of a mist was observed on leaving the nozzle, which solidified rapidly on contact with the carbon dioxide.

The rest of the operations were carried out as in Example 2.

SEC analysis showed that the functionalization did not induce any modification in the distribution of the molecular weights, since the polydispersity indices (Ip) of the polymers before and after the reaction with the carbon dioxide were identical (Ip=1.21) (graph not shown).

The $^1$H NMR analysis after esterification with diazomethane, as in Example 1, gave a proportion of (—COOCH$_3$) functions of 318 meq/kg, which, given the molecular weight measured by tonometry on the styrene/butadiene copolymer before reaction (4960 g/mol), corresponds to a proportion of functions of 79%.

As regards these Examples 2 to 5, it will be noted that the spraying of the solution of living polymer in the form of a jet in the shape of a hollow cone promotes the interaction between the carbon dioxide and the droplets resulting from this spraying, compared, e.g., with spraying in the form of a solid cone.

We claim:

1. A process for carbonation of a living diene polymer obtained anionically comprising spraying a solution of the polymer through a nozzle having an inlet and an outlet into a chamber having therein a carbon dioxide bath substantially at rest, the carbon dioxide bath filling the chamber, such that the polymer and carbon dioxide interact to form a solution of carbonated polymer, wherein the spraying is carried out under conditions whereby there is a difference in hydrostatic pressure between the inlet to the nozzle and the chamber.

2. The process according to claim 1 wherein the difference in hydrostatic pressure is a value from $10^5$ to $10 \times 10^5$ Pa.

3. The process according to claim 1, wherein spraying of the solution of living polymer into the chamber is carried out at a temperature of between −50° C. and 100° C.

4. The process according to claim 1, wherein the relative pressure of the carbon dioxide in the chamber is between $0.01 \times 10^5$ and $10 \times 10^5$ Pa.

5. The process according to claim 1, further comprising spraying the living polymer solution in the form of a jet of droplets substantially in the form of a hollow cone having a crown-shaped section, such that said droplets have an average size of less than 100 μm.

6. The process according to claim 1, wherein the chamber comprises a tower, such that the spraying is provided in an upper part of the tower and that the solution of carbonated polymer is collected in a lower part of the tower.

7. The process according to claim 6, wherein the carbon dioxide is introduced into the chamber via a side inlet provided in the lower part of the tower.

8. The process according to claim 1, wherein the characterized solution of living polymer has a Newtonian viscosity of less than 2 Pa.s.

9. The process according to claim 1, further comprising stopping said carbonation in the chamber by reacting, with stirring, the solution of carbonated polymer with a sufficiently strong acid, such that a carbonated polymer bearing at its chain end or ends one or more carboxylic acid functions is obtained.

10. The process according to claim 9, comprising stirring said solution of carbonated polymer in a tank which communicates with the chamber, and at the same time spraying the acid in the form of droplets in the direction of the tank.

11. The process according to claim 10, wherein the acid is sprayed through a nozzle provided in the upper part of the tower, such that the droplets of acid entrain the carbonated particles which have remained on the side wall of the tower towards the tank.

* * * * *

UNITED STATES PATENT AND TRADEMARK OFFICE
CERTIFICATE OF CORRECTION

PATENT NO.   : 6,380,321 B1
DATED        : April 30, 2002
INVENTOR(S)  : Robert et al.

It is certified that error appears in the above-identified patent and that said Letters Patent is hereby corrected as shown below:

Column 5,
Lines 31-32, "styrenelbutadiene" should read -- styrene/butadiene --
Line 54, "a-1,2" should read -- a 1,2 --

Column 6,
Line 13, "arnine" should read -- amine --
Line 43, "¶(1150 ppm),and" should read -- (1150 ppm), and --
Line 46, "¶corresponds" should read -- corresponds --

Column 8,
Line 51, "¶the" should read -- the --

Column 13,
Line 3, "¶(150 ppm), and" should read -- (150 ppm), and --

Signed and Sealed this

Twenty-third Day of September, 2003

JAMES E. ROGAN
*Director of the United States Patent and Trademark Office*